(12) United States Patent
Brown et al.

(10) Patent No.: US 8,577,357 B2
(45) Date of Patent: *Nov. 5, 2013

(54) DEVICE AND METHOD FOR GENERATING USER NOTIFICATIONS ASSOCIATED WITH TASKS THAT ARE PENDING COMPLETION

(75) Inventors: Michael K. Brown, Waterloo (CA);
Michael S. Brown, Waterloo (CA);
Michael G. Kirkup, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 159 days.

This patent is subject to a terminal disclaimer.

(21) Appl. No.: 13/206,847

(22) Filed: Aug. 10, 2011

(65) Prior Publication Data

US 2011/0294471 A1   Dec. 1, 2011

Related U.S. Application Data

(63) Continuation of application No. 12/758,254, filed on Apr. 12, 2010, now Pat. No. 8,010,098, which is a continuation of application No. 11/192,264, filed on Jul. 29, 2005, now Pat. No. 7,697,926.

(51) Int. Cl.
*H04M 3/00* (2006.01)

(52) U.S. Cl.
USPC ........................................ 455/419; 455/550.1

(58) Field of Classification Search
USPC ........................................ 455/419, 550.1, 567
See application file for complete search history.

(56) References Cited

U.S. PATENT DOCUMENTS

| | | | |
|---|---|---|---|
| 7,221,937 | B2 | 5/2007 | Lau et al. |
| 7,697,926 | B2 | 4/2010 | Brown et al. |
| 8,010,098 | B2 | 8/2011 | Brown et al. |
| 2002/0068615 | A1 | 6/2002 | Yamada |
| 2002/0102999 | A1 | 8/2002 | Maggenti et al. |
| 2003/0198324 | A1 | 10/2003 | Chang et al. |
| 2004/0198426 | A1 | 10/2004 | Squibbs et al. |
| 2006/0030295 | A1 | 2/2006 | Adams et al. |
| 2006/0073819 | A1 | 4/2006 | Lowles |
| 2007/0293205 | A1 | 12/2007 | Henderson |

FOREIGN PATENT DOCUMENTS

| | | |
|---|---|---|
| EP | 1748624 | 9/2007 |
| EP | 1858231 | 7/2008 |
| HK | 1100249 | 5/2008 |
| WO | 2005/015867 | 2/2005 |

OTHER PUBLICATIONS

European Search Report. Application No. 05107028. Dated: Jan. 3, 2006.

(Continued)

*Primary Examiner* — Creighton Smith
(74) *Attorney, Agent, or Firm* — Bereskin & Parr LLP/S.E.N.C.R.L., s.r.l

(57) ABSTRACT

A device and method for generating user notifications associated with tasks that are pending completion on a mobile device. When additional input is required from a user of the mobile device to complete performance of a task and is not being received from the user within a predefined time period, at least one form of user notification is generated. The particular form or forms of user notification are defined by a user profile associated with the user. User notifications may comprise visual, audible, and/or vibratory alerts, and different forms of these user notifications may be generated in a sequence. The volume of audible alerts or the period between periodic user notifications may vary over time.

25 Claims, 5 Drawing Sheets

(56) References Cited

OTHER PUBLICATIONS

Coskun, Risvao, "Wireless E-mail Security: A State-of-the-Art Review for Message Privacy and Protection form Application Perspective", Southeastcon, 2004, Proceedings, IEEE Greensboro, North Carolina, USA, Piscataway, NJ, USA, IEEE, 2004, pp. 413-418, XP010697866.
European Communication Under Rule 51(4) EPC. Application No. 05107028.2. Dated: Mar. 19, 2007.
European Communication Under Rule 71(3) EPC. Application No. 07112334.3. Dated: Feb. 1, 2008.
European Examination Report. Application No. 05107028.2. Dated: Sep. 21, 2006.
European Search and Examination Report. Application No. 07112334.3. Dated: Oct. 15, 2007.
Canadian First Office Action. Application No. 2,550,319. Dated: Jan. 27, 2010.
Office Action. Canadian Application No. 2,550,319. Dated: May 25, 2011.
Response. European Patent Application No. 05107028.2. Dated: Jun. 20, 2006.
Response. European Patent Application No. 05107028.2. Dated: Feb. 2, 2007.
Decision to grant a European patent pursuant to article 97(2) EPC. European Patent Application No. 05107028.2. Dated: Aug. 30, 2007.
Decision to grant a European patent pursuant to article 97(1) EPC. European Patent Application No. 07112334.3. Dated: Jun. 19, 2008.
Prosecution Documents for U.S. Appl. No. 11/192,264, issued to Patent No. 7,697,926 on Apr. 13, 2010.
Prosecution Documents for U.S. Appl. No. 12/758,254, issued to Patent No. 8,010,098 on Aug. 30, 2011.
Notice of Allowance. Canadian Patent Application No. 2,550,319. Dated: Sep. 4, 2013.

DEVICE AND METHOD FOR GENERATING USER NOTIFICATIONS ASSOCIATED WITH TASKS THAT ARE PENDING COMPLETION

CROSS REFERENCE TO RELATED APPLICATION

This application is a continuation of U.S. patent application Ser. No. 12/758,254, filed Apr. 12, 2010, which is a continuation of U.S. patent application Ser. No. 11/192,264, filed on Jul. 29, 2005. U.S. patent application Ser. No. 12/758,254 issued to patent as U.S. Pat. No. 8,010,098 and U.S. patent application Ser. No. 11/192,264 issued to patent as U.S. Pat. No. 7,697,926. The entire contents of application Ser. No. 12/758,254, and application Ser. No. 11/192,264 are hereby incorporated by reference.

FIELD OF THE INVENTION

Embodiments of the invention relate generally to mobile devices and methods for generating user notifications thereon.

BACKGROUND OF THE INVENTION

When a user wishes to send a message from a mobile device that he or she has composed, such as an electronic mail ("e-mail") message for example, the user will typically provide some input to the mobile device through the user interface of a messaging application in order to initiate the processing of the message for sending. For instance, the user may select a "send" button or menu option to send the message. Once this selection is made, users generally expect that unless an error message is generated and displayed to them immediately, the message will automatically be sent with no further input or other user intervention required.

When a message is sent by a user that is to be encoded using a secure messaging protocol, such as the Secure Multiple Internet Mail Extensions ("S/MIME") protocol, or the Pretty Good Privacy™ (PGP) protocol or a variant thereof for example, a number of processing actions may need to take place before the message can actually be sent to its intended destination. For example, it may be necessary for the messaging application to request an update of a security policy from a policy engine (e.g. as implemented in a PGP Universal Server). This security policy dictates the particular encoding that is to be applied to a message. As a further example, it may be necessary for the messaging application to obtain an S/MIME certificate or a PGP key from a local store or a remote server before a message is encoded and sent. It may also be necessary for the messaging application to verify the status of a particular S/MIME certificate before the message is encoded and sent.

Should the messaging application encounter any problems when performing the processing actions for a message or require further input from the user before it can complete the processing of the message for sending, the mobile device may prompt the user for additional information or prompt the user to make a decision as to what should be done with the message. For example, if the messaging application is unable to verify the status of a certain certificate required to encode a message, the user may be asked to decide whether the message should be sent without encoding.

Unfortunately, it may take some time after the user initiates the processing of the message for sending before a problem is identified. Meanwhile, the user may have assumed that the message would be sent, and consequently, the user may no longer be paying attention to the mobile device. In particular, the user may have placed the mobile device into a belt holster, in a cradle, or in some other location (e.g. left on a desk), such that the mobile device is left unattended. In those cases, the user may not be aware that additional input is required before the mobile device will actually send the message.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Further to the example provided above, if a messaging application encounters any problems when performing certain processing actions for a message that the user has directed the application to send, or if the application requires additional input from the user before it can complete the processing of the message for sending, it may be necessary to regain the attention of the user who may have left the mobile device unattended.

More generally, whenever a user initiates performance of any task on the mobile device that he or she expects to be automatically performed without the need for additional input or user intervention, it may be necessary to subsequently regain the attention of the user who may have left the mobile device unattended, so that the user can be notified that additional input is required before performance of the task can be completed.

Embodiments described herein relate generally to a device and methods in which the user is notified that additional input is required before performance of the task can be completed.

In one broad aspect, there is provided a method of generating user notifications associated with tasks that are pending completion on a mobile device, the method comprising the steps of: receiving input from a user to initiate performance of a task on the mobile device; and when additional input is required to complete performance of the task, prompting the user for the additional input, determining if the additional input is not being received from the user within a predefined time period, and generating at least one form of user notification as defined by a user profile associated with the user, if the additional input is not being received from the user within the predefined time period.

These and other aspects and features of various embodiments will be described in greater detail below.

Embodiments described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
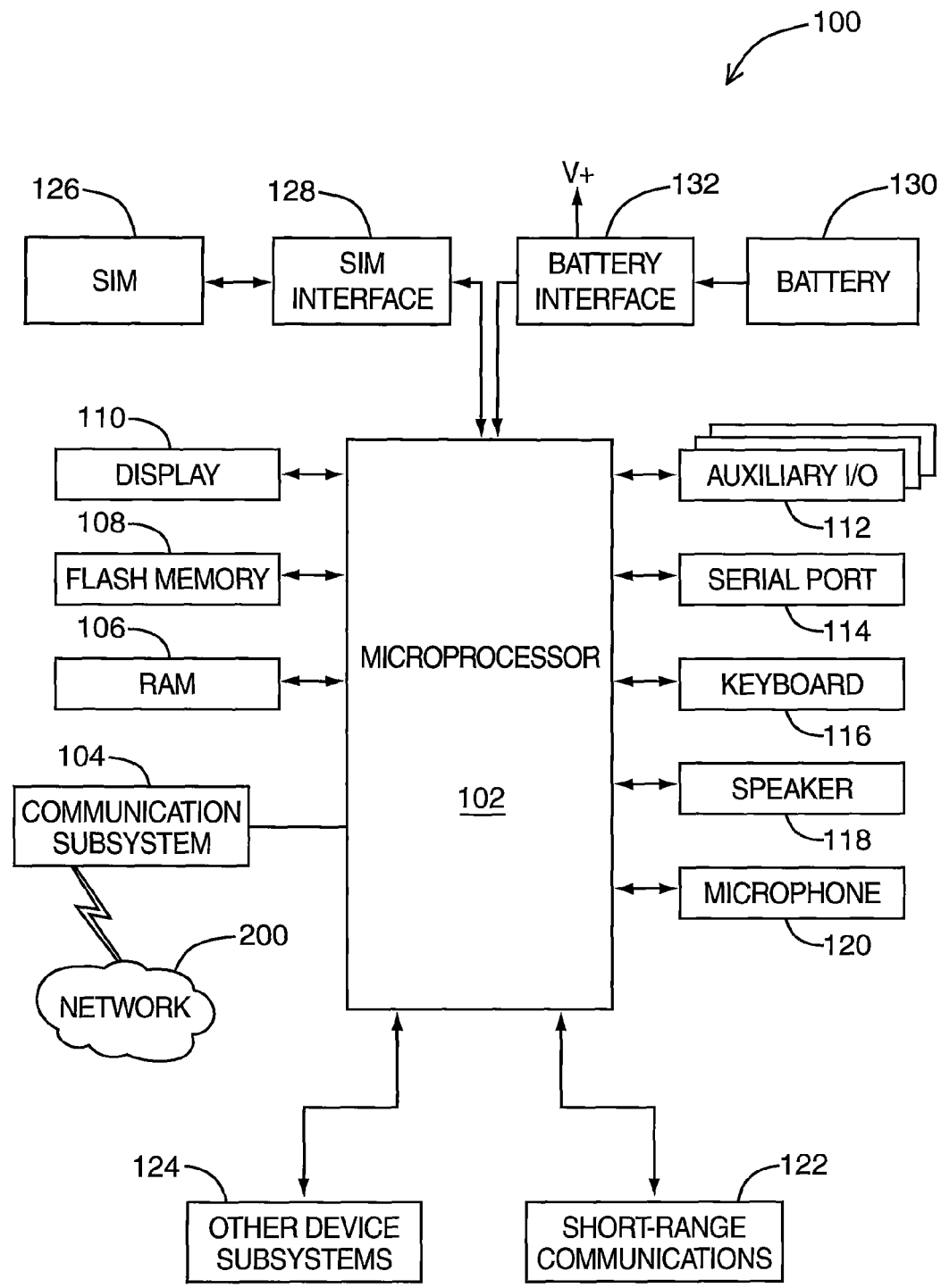
FIG. 1 is a block diagram of a mobile device in one example implementation.
Figure 2:
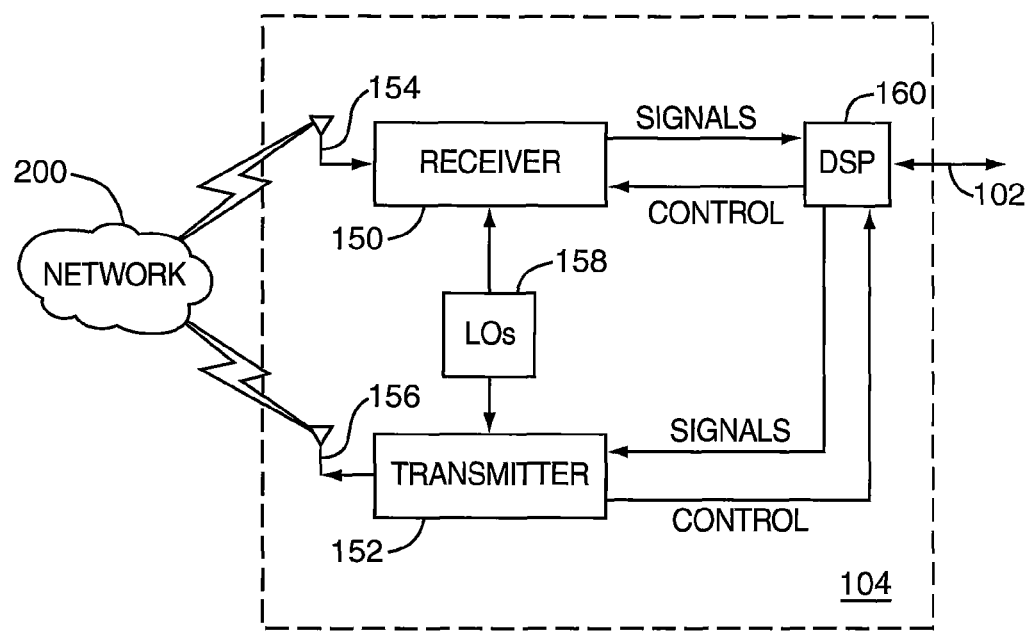
FIG. 2 is a block diagram of a communication subsystem component of the mobile device of FIG. 1.
Figure 3:
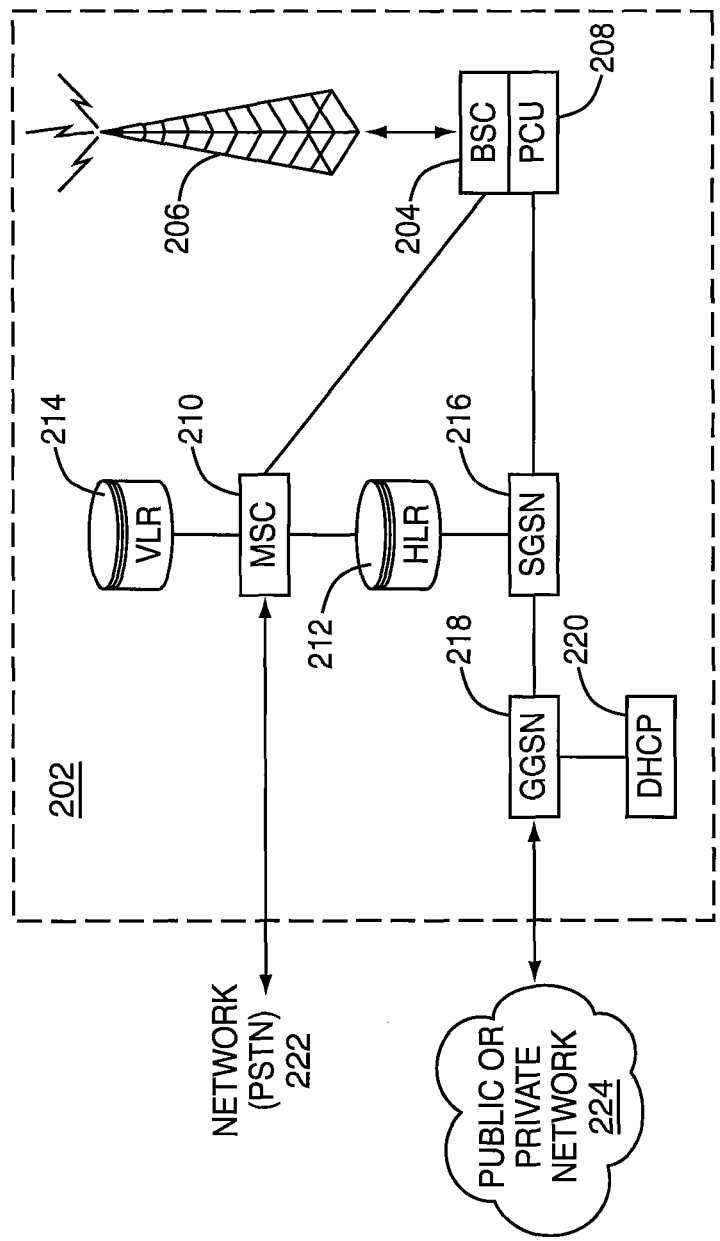
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
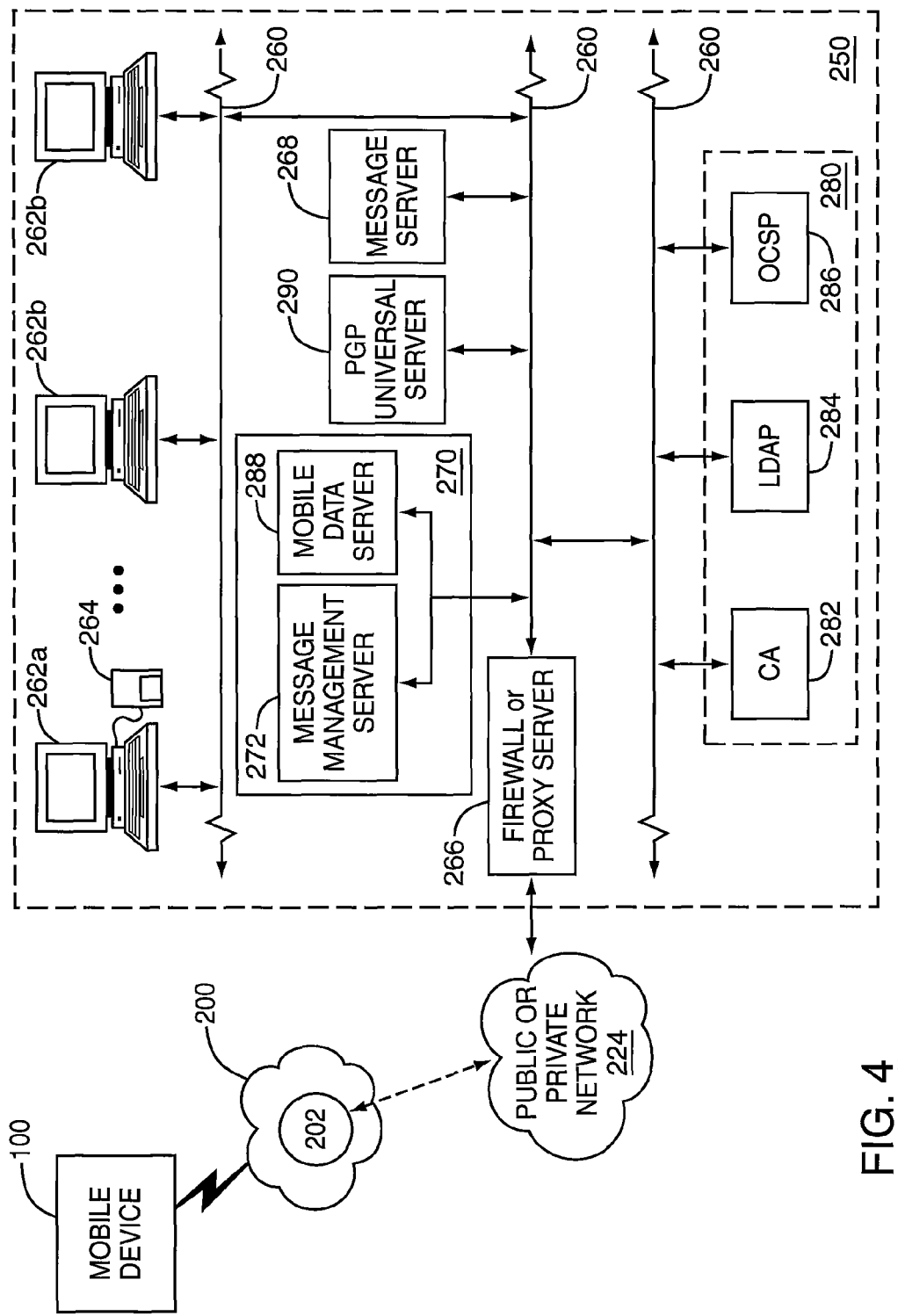
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262*b* within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262*a* may request the e-mail messages associated with that user's account stored on message server 268. These messages would then typically be retrieved from message server 268 and stored locally on computer 262*a*.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262*a*, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Certificates may be used in the processing of encoded messages, such as e-mail messages, that are encrypted and/or signed, in accordance with certain secure messaging protocols. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. In S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

For the purposes of the specification and in the claims, the term "certificate" is used generally to describe a construct used to provide public keys for encoding and decoding messages and possibly information on the key holder, and may be deemed to include what is generally known as a "PGP key" and other similar constructs.

Standard e-mail security protocols typically facilitate secure message transmission between non-mobile computing devices (e.g. computers 262*a*, 262*b* of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262*a* will typically be downloaded from computer 262*a* to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262*a* through cradle 264, for example. The private key is preferably exchanged between the computer 262*a* and mobile device 100 so that the user may share one identity and one method for accessing messages.

User computers 262*a*, 262*b* can obtain S/MIME certificates and PGP keys from a number of sources, for storage on computers 262*a*, 262*b* and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262*a*, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262*a*, 262*b*, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

In the example shown in FIG. 4, a policy engine 290 resides in LAN 250. The policy engine 290 may be provided by way of a PGP Universal Server developed by PGP Corporation. This is only one example. The policy engine may be implemented in some other device or construct other than a PGP Universal Server, and may be applied in the context of protocols other than PGP (e.g. in an S/MIME policy engine).

A PGP Universal Server 290 is adapted to communicate with a user's desktop computer (e.g. 262a) and the user's mobile device (e.g. 100 via message management server 272), and may be further adapted to encrypt messages and enforce compliance of security requirements with respect to messages being sent by the user, based on security policies established by an administrator, for example. The placement of PGP Universal Server 290 in LAN 250 as shown in FIG. 4 is provided by way of example only, and other placements and configurations are possible. Depending on the placement of the PGP Universal Server 290 and the particular configuration of LAN 250 in which PGP Universal Server 290 may be employed, the level of control over processed messages that are subject to security encoding, and in particular, over messages being sent by a user may vary.

For example, PGP Universal Server 290 may be adapted to directly process all outgoing messages (i.e. messages being sent by the user from the user's desktop computer, mobile device, or other computing device to one or more intended recipients), where it will make decisions on which messages to encrypt and/or sign, if at all, in accordance with policies defined on the PGP Universal Server 290 as configured by the administrator. If a security policy dictates that a message about to be sent by the user to a particular domain or pertaining to a particular subject is to be encrypted and signed using PGP for example, the PGP Universal Server 290 may itself encrypt and sign the message before transmission.

Alternatively, the user, through a PGP-enabled messaging application on the user's computing device that communicates with PGP Universal Server 290 for example, may download security policy data from the PGP Universal Server 290 to the user's computing device. The user or the application may then be directed to encrypt and sign the message before transmission, based on the security policy data obtained.

Accordingly, PGP Universal Server 290 provides the ability to enforce centralized policy based on domains and other mechanisms.

The PGP Universal Server 290 may also be adapted to store, validate, and otherwise manage PGP keys, and to retrieve PGP keys from remote key stores when the keys are required to encode (e.g. encrypt and/or sign) messages. Where requested by a user or application, PGP Universal Server 290 may also provide stored or retrieved PGP keys to the user as needed.

By adopting the use of a policy engine such as that implemented by a PGP Universal Server 290 as described herein by way of example, much of the burden associated with processing secure messages (e.g. e-mail), and in particular, with deciding what messages are to be sent securely and what security encoding should apply on a case-by-case basis, can be transferred to the policy engine.

Figure 5:
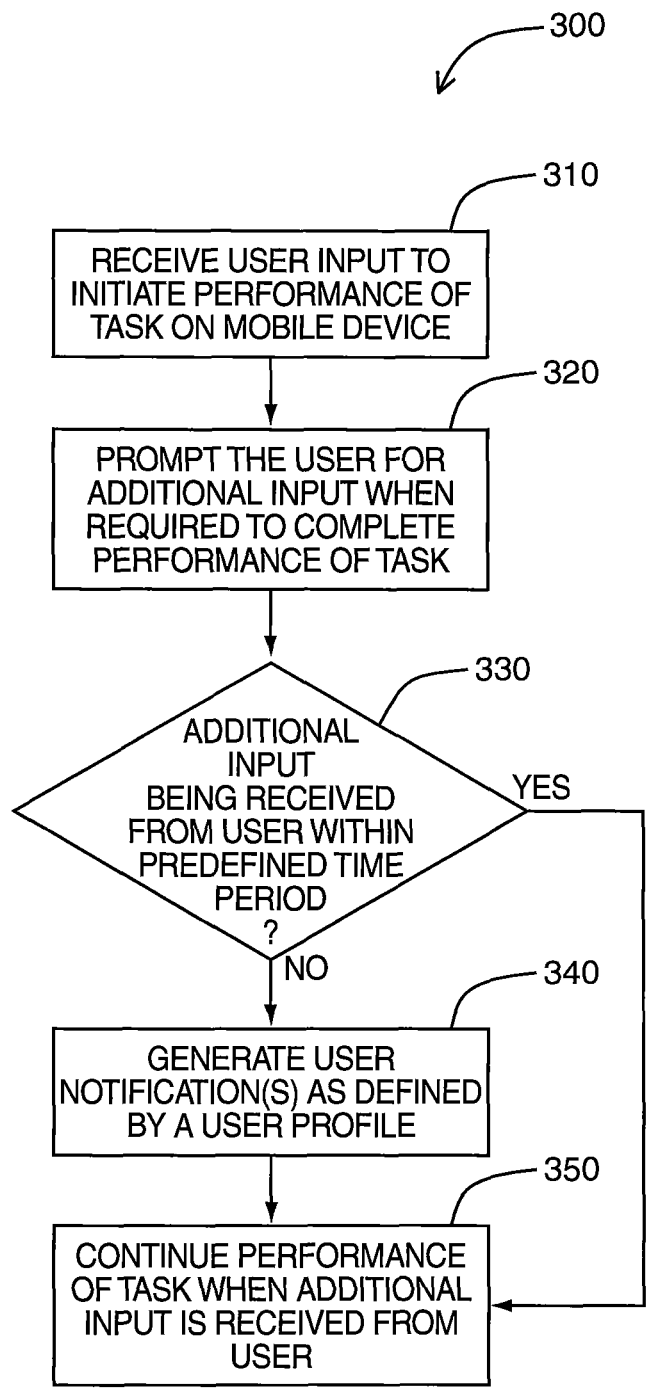
FIG. 5 is a flowchart illustrating steps in a method of generating user notifications associated with tasks pending completion on a mobile device, in accordance with a number of example embodiments.

Referring now to FIG. 5, a flowchart illustrating steps in a method of generating user notifications associated with tasks pending completion on a mobile device, in accordance with a number of example embodiments, is shown generally as 300.

Steps of method 300 are performed by an application executing and residing on the mobile device (e.g. mobile device 100 of FIG. 4). The application may be an e-mail or other messaging application, another application coupled to or otherwise integrated with the e-mail or other messaging application (e.g. an add-on component providing the requisite functionality), or some other application programmed to perform such steps.

In embodiments of method 300, the user is notified that additional input is required before performance of a task can be completed. Generally, whenever a user initiates performance of a task on the mobile device that he or she expects to be automatically performed without the need for additional input or user intervention, it may be necessary to subsequently regain the attention of the user who may have left the mobile device unattended.

At step 310, input to initiate performance of a task on a mobile device is received from a user of the mobile device.

By way of example, in one embodiment, the task comprises processing a message (e.g. an e-mail message) composed by the user. The user may wish to send the message securely (e.g. encrypted and/or signed), or a message encoding may be suggested or enforced by a policy engine (e.g. as implemented in a PGP Universal Server 290 of FIG. 4). The user may wish to have the message sent to one or more recipients, and may provide the messaging application with a direction that the message is to be sent, by selecting a "send" button or menu option, for example. When the direction is received by the messaging application, processing of the message for sending is initiated.

Typically, unless an error is detected by the messaging application immediately after the direction is received and the user is notified of the error, the user may assume that the message will be sent without the need for additional input or user intervention. Subsequently, the user may leave the mobile device unattended in a holster (e.g. a belt holster), in a cradle (e.g. cradle 264 of FIG. 4), or in some other location (e.g. desk, pocket, bag, etc.), for example.

At step 320, if in the process of performing the task, additional input is required to complete performance of the task initiated at step 310, the user is prompted for the additional input.

With reference to the above-mentioned example, consider the situation where a message composed by the user is to be encrypted and sent to one or more recipients. The certificate (which may, for example, be a S/MIME certificate or a PGP key) of each recipient to which the message is to be encrypted is required. Therefore, the processing of the message composed by the user will require a number of actions to be performed, which may include searching for and retrieving the requisite certificate(s) from a local or remote certificate/key store or certificate server (e.g. LDAP server 284 of FIG. 4), and verifying the status of the certificate (which may include, for example, verifying certificate validity/expiry, revocation status, key strength, and/or trust status), for example.

Processing of the message may also require that a correct password be obtained from the user as input, as may be required when an attempt to access a certificate in certain protected certificate/key stores on the mobile device is made.

Processing of the message may comprise performing actions that require additional input from the user before the processing of the message for sending can be completed other than those described above, by way of example.

The additional input required to complete the processing of the message may be in the form of input indicating the response to a question that has been posed to a user. For example, in processing the message, the requisite certificate associated with a potential recipient may be determined to be "not trusted". The messaging application can prompt the user for input indicating whether or not the user still wishes to proceed with sending the message, despite the fact that a certificate that is not trusted would be used to encrypt the message. As a further example, in processing the message, multiple certificates for a given potential recipient may have been located, any of which might be used to encrypt the message. The messaging application may need to prompt the user for additional input indicating which of the located certificates should be used to encrypt the message.

When the user is prompted for additional input at step 320, the messaging application is adapted to wait for a response from the user. Progress in the performance of the task (e.g. further processing of the message) may be temporarily suspended until the additional input is received from the user. Alternatively, other actions may be completed in the background while a response from the user is pending.

If the user is operating the mobile device and notices the prompt, the user may begin to provide the required additional input immediately. However, if the user is not operating the device and has left the mobile device unattended, the user may not notice the prompt. The latter situation may be more likely to occur when the messaging application is unable to determine that additional input is required immediately after the user initiates the task.

For example, when a message is, to be encoded using PGP in accordance with a security policy, and where security policy data must first be downloaded from a policy engine (e.g. as implemented in a PGP Universal Server 290 of FIG. 4), there may be a delay between the time the user directed the message to be sent, and the time when the security policy data is retrieved. The reporting of problems arising in the retrieval of security policy data, or of any problems that may arise from actions to be performed after the retrieval of such data, may consequently be delayed. If additional input is required from the user in order to determine how these problems should be overcome, the user is not likely to be prompted for the additional input immediately after the user directs the message to be sent. By the time the messaging application determines that additional input is required, the user may have since left the mobile device unattended.

At step 330, a determination is made as to whether additional input is not being received from the user within a predefined time period. The predefined time period establishes how long the messaging application will wait before proceeding to generate user notifications if the user is not in the process of responding to the prompt. For example, once the user is prompted for the additional input at step 320 (e.g. via a window appearing in a display of the mobile device), the messaging application may allow 30 seconds (or some other length of time) to elapse. If the user has not attempted to respond to the prompt in this period, user notifications will then be generated (step 340).

The predefined time period may be fixed by the messaging application, or it may be configurable by the user by modifying a setting in device preferences or in a user profile, for example. As a further example, the predefined time period may be set in accordance with an IT policy governing use of the mobile device.

If the additional input is received or is at least in the process of being received from the user within the predefined time period (e.g. the user may be scrolling through a number of selections or entering data on the keyboard, and therefore, is in the process of responding to the prompt and need not be further notified), then the flow of method steps proceeds to step 350, wherein progress in the performance of the task can continue upon receipt of the additional input.

However, if the additional input is not being received from the user within the predefined time period, then it is likely that the user is no longer attending to or otherwise paying attention to the device. Meanwhile, completion of the task initiated at step 310 remains pending.

Accordingly, at step 340, at least one form of user notification is generated, in order to regain the attention of the user so that the user can respond to the prompt for additional input.

The at least one form of user notification generated at step 340 may continue to be generated until the additional input is being received by the user (i.e. the user begins to respond to the prompt).

The messaging application may also be adapted to generate the at least one form of user notification until a second predefined time period has elapsed, after which completion of the task may remain pending, or performance of the task, cancelled. For example, if after two minutes (or some other period of time) the user has still not responded to the prompt, it may be that the user is away from the mobile device and is not receiving the notifications. The generation of notifications may be suspended temporarily and subsequently continued at a later time, or performance of the task may be cancelled altogether.

The second predefined time period may be fixed by the messaging application, or it may be configurable by the user by modifying a setting in device preferences or in a user profile, for example. As a further example, the second predefined time period may be set in accordance with an IT policy governing use of the mobile device.

The at least one form of user notification is generated at step 340 as defined by a user profile associated with the user. Accordingly, a flexible notification system tied to a user's profile is provided. For example, a user profile may define certain alert settings, associated with different environments or desired privacy levels (e.g. "Quiet" mode, "Outdoors" mode, etc.). The forms of user notification to be generated at step 340 are configured to be dependent on the user profile and the alert setting currently enabled by the user.

In one embodiment, the at least one form of user notification generated at step 340 is based on a state of the mobile device. For example, different forms of user notification may be generated when the mobile device is in a cradle (e.g. cradle 264 of FIG. 4), when the mobile device is in a holster, and when the mobile device is neither in a cradle nor in a holster.

A number of different forms of user notification may be generated in various embodiments. One form of a user notification that may be employed is a visual alert. A flashing LED indicator on the mobile device may provide the visual alert, for example. Another form of a user notification that may be employed is an audible alert. The audible alert may be provided by a "beep" noise, an audio tone, or a musical tone, for example. Another form of a user notification that may be employed is a vibratory alert. The vibratory alert will cause the mobile device to physically vibrate. Other forms of user notification may be employed in variant embodiments.

Furthermore, successively generated alerts may vary over time. For instance, the color or flashing rate of a visual alert may be varied. Audible alerts may vary in volume (e.g. the volume of audible alerts may escalate over time). The force with which a mobile device vibrates may be varied.

In at least one embodiment, the at least one form of user notification generated at step 340 is generated periodically. For example, an audible alert (e.g. "beep") may be generated every two seconds (or some other period). Furthermore, the period at which user notifications are generated may also vary. For example, an audible alert may initially be generated every 10 seconds (or some other period) over a certain length of time, with subsequent alerts being generated at a faster rate, until an audible alert is generated every second (or some other period).

In one embodiment, the at least one form of user notification generated at step 340 comprises multiple forms of user notification that are to be generated in sequence. Put another way, the user profile may be customized such that the user notifications change in type over time. For example, when user notifications are to be generated at step 340, a number of visual alerts may first be generated, followed by a number of vibratory alerts, and finally followed by a number of audible alerts. This represents a sequence in which the noise created by each of the different forms of user notification escalates over time.

It will be understood that some or all of the features of the various embodiments described above may be combined in a given implementation. For example, when the additional input is not being received from the user within a predefined time period, an LED indicator may first be flashed every few seconds for 15 minutes, then the mobile device may be vibrated every minute for 15 minutes. This may be followed by the emitting of a "beep" every few seconds for minutes, which may also increase in volume over this period. The rate at which any of these alerts are generated may also be escalated over the indicated periods, for example. This sequence may also be modified depending on the state of the mobile device (e.g. whether the mobile device is in a holster, whether the mobile device is in a cradle, etc.).

As noted above, user notifications may be generated at step 340 until the additional input is received or is in the process of being received from the user, wherein the flow of method steps will then proceed to step 350 at which progress in the performance of the task can continue upon receipt of the additional input. Alternatively, the user notifications may be generated until a second predefined time period has elapsed, after which completion of the task may remain pending or performance of the task may be cancelled [step not shown].

Although features of some of the embodiments of method 300 have been described primarily with respect to tasks comprising the processing of messages composed by a user for sending to one or more recipients, the described features may also be applicable in respect of other tasks, in variant embodiments.

For example, in a variant embodiment, the task comprises searching messages. The user may initiate a search on the mobile device for a message stored in one or more message folders, or for specific text in a message (e.g. text in the body of the message, text in a sender's e-mail address identified in the header of the message, text in a recipient's e-mail address identified in the header of the message, text in the subject of a message, etc.), by providing one or more search terms and possibly selecting a search button or menu selection. While the search is being performed, the messaging application may encounter an encrypted message to which access is required, for example. In that case, it may be necessary to obtain the requisite password from the user before data of the encrypted message can be decrypted and accessed for searching purposes. The search cannot be completed until the user provides the requisite password as additional input, and the search may potentially be suspended until the user provides the requisite password as additional input.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of generating user notifications on a mobile device, the method comprising:
    receiving user input to initiate searching of text in one or more messages on the mobile device;
    determining if a processor of the mobile device is awaiting user input of a password, the password for decrypting encrypted data of at least one of the one or more messages;
    prompting for the user input of the password;
    determining if the user input of the password is not received within a predefined time period; and
    generating at least one form of user notification if the user input of the password is not received within the predefined time period.

2. The method of claim 1, wherein if the processor of the mobile device is awaiting user input of the password, the processor suspends the searching of text in the one or more messages until the password is provided as user input.

3. The method of claim 1, wherein the generating is repeated until the user input is received.

4. The method of claim 1, wherein the at least one form of user notification is generated periodically.

5. The method of claim 4, wherein the period at which the at least one form of user notification is generated varies.

6. The method of claim 1, wherein the at least one form of user notification is generated until a second predefined time period has elapsed.

7. The method of claim 1, wherein the at least one form of user notification is generated in accordance with a user profile.

8. The method of claim 7, wherein the user profile defines the at least one form of user notification that is to be generated based on a state of the mobile device.

9. The method of claim 8, wherein the state of the mobile device is a state selected from the following group: the mobile device is in a cradle; the mobile device is in a holster; and the mobile device is neither in a cradle nor in a holster.

10. The method of claim 7, wherein the user profile defines a plurality of forms of user notification that is to be generated in a sequence.

11. The method of claim 1, wherein the at least one form of user notification consists of at least one of the following: a visual alert, an audible alert, and a vibratory alert.

12. The method of claim 1, wherein the at least one form of user notification varies over time.

13. A computer-readable storage medium upon which a plurality of instructions are stored, the instructions, which when executed by a processor of a mobile device, cause the processor to:
    receive user input to initiate searching of text in one or more messages on the mobile device;
    determine if the processor is awaiting user input of a password, the password for decrypting encrypted data of at least one of the one or more messages;
    prompt for the user input of the password;
    determine if the user input of the password is not received within a predefined time period; and
    generate at least one form of user notification if the user input of the password is not received within the predefined time period.

14. A mobile device comprising a processor, wherein the processor is configured to:
    receive user input to initiate searching of text in one or more messages on the mobile device;

determine if the processor of the mobile device is awaiting user input of a password, the password for decrypting encrypted data of at least one of the one or more messages;

prompt for the user input of the password;

determine if the user input of the password is not received within a predefined time period; and generate at least one form of user notification if the user input of the password is not received within the predefined time period.

15. The device of claim 14, wherein if the processor of the mobile device is awaiting user input of the password, the processor suspends the searching of text in the one or more messages until the password is provided as user input.

16. The device of claim 14, wherein generation of the at least one form of user notification is repeated until the user input is received.

17. The device of claim 14, wherein the at least one form of user notification is generated periodically.

18. The device of claim 17, wherein the period at which the at least one form of user notification is generated varies.

19. The device of claim 14, wherein the at least one form of user notification is generated until a second predefined time period has elapsed.

20. The device of claim 14, wherein the at least one form of user notification is generated in accordance with a user profile.

21. The device of claim 20, wherein the user profile defines the at least one form of user notification that is to be generated based on a state of the mobile device.

22. The device of claim 21, wherein the state of the mobile device is a state selected from the following group: the mobile device is in a cradle; the mobile device is in a holster; and the mobile device is neither in a cradle nor in a holster.

23. The device of claim 20, wherein the user profile defines a plurality of forms of user notification that is to be generated in a sequence.

24. The device of claim 14, wherein the at least one form of user notification consists of at least one of the following: a visual alert, an audible alert, and a vibratory alert.

25. The device of claim 14, wherein the at least one form of user notification varies over time.

* * * * *